(12) United States Patent
Shirai et al.

(10) Patent No.: US 8,166,838 B2
(45) Date of Patent: May 1, 2012

(54) ACTUATOR FOR DRIVING MOVABLE OBJECT AND MOTION GUIDE APPARATUS FOR GUIDING MOTION OF MOVABLE OBJECT

(75) Inventors: Takeki Shirai, Shinagawa-ku (JP); Masashi Konomoto, Shinagawa-ku (JP)

(73) Assignee: THK Co., Ltd., Tokyo (JP)

( * ) Notice: Subject to any disclaimer, the term of this patent is extended or adjusted under 35 U.S.C. 154(b) by 303 days.

(21) Appl. No.: 10/584,191

(22) PCT Filed: Nov. 15, 2004

(86) PCT No.: PCT/JP2004/016955
§ 371 (c)(1),
(2), (4) Date: Jun. 23, 2006

(87) PCT Pub. No.: WO2005/064173
PCT Pub. Date: Jul. 14, 2005

(65) Prior Publication Data
US 2007/0144282 A1 Jun. 28, 2007

(30) Foreign Application Priority Data

Dec. 25, 2003 (JP) ................................. 2003-429843
Apr. 30, 2004 (JP) ................................. 2004-136749

(51) Int. Cl.
*F16H 3/06* (2006.01)
(52) U.S. Cl. ........................................ 74/89.32; 384/43
(58) Field of Classification Search ...... 74/89.23–89.39; 384/43–45
See application file for complete search history.

(56) References Cited

U.S. PATENT DOCUMENTS

| 4,629,337 | A | * | 12/1986 | Teramachi ..................... 384/43 |
| 4,974,969 | A | * | 12/1990 | Jacob ............................. 384/43 |
| 5,761,960 | A | * | 6/1998 | Nagai et al. .................. 74/89.33 |
| 5,799,543 | A | * | 9/1998 | Nagai et al. ................. 74/490.09 |
| 6,655,225 | B1 | * | 12/2003 | Nagai et al. .................. 74/89.33 |
| 2002/0144561 | A1 | * | 10/2002 | Nagai et al. .................. 74/89.33 |
| 2003/0164054 | A1 | * | 9/2003 | Kuo et al. ..................... 74/89.33 |

FOREIGN PATENT DOCUMENTS

| JP | 61-29163 U | 2/1986 |
| JP | 61-145119 U | 9/1986 |
| JP | 62-56616 A | 3/1987 |
| JP | 63-79129 U | 5/1988 |
| JP | 1-77162 U | 5/1989 |
| JP | 4-164540 A | 6/1992 |
| JP | 05087138 A | * | 4/1993 |
| JP | 2002-174317 A | 6/2002 |

* cited by examiner

*Primary Examiner* — Thomas R Hannon
*Assistant Examiner* — Alan Waits
(74) *Attorney, Agent, or Firm* — Westerman, Hattori, Daniels & Adrian, LLP

(57) ABSTRACT

An actuator has a hollow track rail 6 having a slit 8 extending in an axial direction thereof, a movable block 7 disposed inside the track rail 6 to be movable along the track rail, and a ball screw mechanism for moving the movable block 7 along the axial direction of the track rail 6. The track rail has, in a section perpendicular to the axial direction of the track rail, a guide portion 9 for guiding movement of the movable member 7 and an extension 11 extending from the guide portion 9 so as to cover the movable member, and a width W1 of the slit 8 of the track rail formed between the opposed extensions 11 is narrower than a width W2 of the movable member. Accordingly, the actuator can provide a high rigidity in spite of compact outer dimension.

6 Claims, 8 Drawing Sheets

ACTUATOR FOR DRIVING MOVABLE OBJECT AND MOTION GUIDE APPARATUS FOR GUIDING MOTION OF MOVABLE OBJECT

TECHNICAL FIELD

The present invention relates to an actuator for driving a movable object and a motion guide apparatus for guiding the motion of the movable object.

BACKGROUND TECHNOLOGY

The applicant of the subject application has provided a compact actuator formed, as shown in FIG. 9, in combination of a guide mechanism 3 for guiding a sliding motion of a movable block 1 along a track rail 2 and a ball screw mechanism 4 for moving the movable block 1.

The track rail 2 is formed so as to provide a generally U-shape in section having a bottom portion and a pair of wall portions, and the movable block 1 is clamped between the opposing paired wall portions. The movable block 1 has a ball screw portion at its central portion, and is supported at its both side portions by the wall portions of the track rail 2. The ball screw portion of the movable block 1 is screw engaged with a screw shaft 4 penetrating the movable block 1. When the screw shaft 4 is rotated, the movable block 1 slides along the track rail 2. The movable block are formed, at its both sides, with loaded ball rolling grooves extending in the axial direction of the track rail 2 so as to provide a guide mechanism 3.

A number of balls are disposed to be rollable between the track rail and the movable block so that the movable block is smoothly slid along the track rail.

In such actuator, since the U-shaped track rail is adopted, high rigidity can be ensured in spite of a compact outer dimension, thus being advantageous.

DISCLOSURE OF THE INVENTION

Problem to be Solved by the Invention

An object of the present invention is to provide an actuator capable of ensuring a high rigidity in spite of more compact outer dimension with the above advantageous feature being maintained.

Means for Solving the Problem

The present invention will be described hereunder, in which although reference numerals described on drawings are added with parenthesis for the easy understanding of the present invention, the present invention is not limited thereby to the embodiment shown in the drawings.

In order to solve the above problem, the actuator of the first aspect of the invention comprises: a hollow track member (6) having a slit extending in an axial direction thereof; a movable member (7) disposed inside the track member (6) to be movable along the track member; and a drive mechanism (17) for moving the movable member (7) along the axial direction of the track member (6), wherein the track member (6) has, in a section perpendicular to the axial direction of the track member (6), a guide portion (9) for guiding movement of the movable member (7) and an extension (11) extending from the guide portion (9) so as to cover the movable member (7), and a width (W1) of the slit (8) of the track member (6) formed between the opposed extensions (11) is narrower than a width (W2) of the movable member (7).

The invention of the second aspect is characterized in that, a single slit (8) is formed in a circumferential direction of the track member (6) in a section perpendicular to the axial direction of the track member.

The invention of the third aspect is characterized in that, the track member (6) has a substantially circular-arc shape in section.

The invention of the fourth aspect is characterized in that, the track member (6) is formed with a rolling member rolling groove (9) extending in the axial direction thereof as the guide portion (9), the movable member (7) is formed with a loaded rolling member rolling groove (13) opposing to the rolling member rolling groove (9) formed to the track member, and a number of rolling member (10) are interposed between the rolling member rolling groove (9) of the track member (6) and the loaded rolling member rolling groove (13) of the movable member (7) to be rollable therebetween.

The actuator of the fifth aspect is characterized in that, the track member (6) is provided with a cover member (21) to be expanded or contracted in the axial direction of the track member (6) so as to entirely cover the track member (6) in the section perpendicular to the axial direction of the track member, and a portion of the movable member (7) projecting over the slit (8) of the track member penetrates the cover member (21).

The actuator of the sixth aspect comprises: a hollow track member (6) having a slit extending in an axial direction thereof; a movable member (7) disposed inside the track member (6) to be movable along the track member; and a drive mechanism (17) for moving the movable member (7) along the axial direction of the track member (6), wherein the track member (6) has a substantially circular-arc shape in a section perpendicular to the axial direction of the track member.

The actuator of the seventh aspect is characterized in that, the drive mechanism (17) is provided with a screw portion formed to the movable member (7) and a screw shaft (17) to be screw engaged with the screw portion, the screw shaft (17) penetrating the movable member (7), the screw shaft has a center line coincident with a center line of an output shaft of a drive source (31) rotating the screw shaft (17), and the drive source has an outer substantially circular shape in a section perpendicular to the axial direction of the track member (6).

A motion guide apparatus of the eighth aspect of the invention comprises: a hollow track member (6) having a slit (8) extending in an axial direction thereof; and a movable member (7) disposed inside the track member (6) to be movable along the track member, wherein the track member (6), in a section perpendicular to the axial direction of the track member, has a guide portion (9) for guiding movement of the movable member (7) and an extension (11) extending from the guide portion (9) so as to cover the movable member, and a width (W1) of the slit (8) of the track member (6) formed between the opposed extensions (11) is narrower than a width (W2) of the movable member (7).

Effect of the Invention

According to the invention of the first aspect, the sectional shape of the track member approaches a closed curved line, and in spite of the compact outer dimension, the second moment of area can be made large. For this reason, an actuator having high rigidity such as flexure rigidity, torsional rigidity and the like can be obtained.

According to the invention of the second aspect, by forming only one slit in the circumferential direction of the track rail, the rigidity can be made further higher. Since the inside of the actuator can be easily sealed, an actuator having improved dust preventing performance can be provided.

According to the invention of the third aspect, in spite of the most compact outer dimension, an actuator having high rigidity can be obtained. In addition, since the degree of freedom for arranging the guide portion of the track member can be enhanced, the guide portion can be located to the most suitable position in accordance with a load to be applied to the movable member.

According to the invention of the fourth aspect, the movable member can be smoothly moved.

According to the invention of the fifth aspect, the highly improved dust preventing effect can be attained with the function of the actuator for moving the movable object being maintained.

In the conventional actuator, the bottom surface of the track rail was formed to be flat, (that is, the track rail is formed so as to provide a U-shape in section), for easy mounting to the flat fixing member such as bed. As in the invention of the sixth aspect, by forming the track member so as to provide a substantially circular-arc shape in section, in the case of obtaining the same flexure rigidity as that of the track rail having U-shaped section, the track member can be made light. For this reason, the actuator can be preferably utilized for a portion at which the actuator is swung such as the front end shaft of an articulated robot. In addition, by forming the track member so as to provide substantially circular-arc shape in section, the uniform flexure rigidity to the load in every direction can be obtained. Furthermore, by forming the track member so as to provide a substantially circular-arc shape in section, the track member can be manufactured from a pipe, for example, resulting in easy working.

According to the invention of the seventh aspect, by making coincident the outer shapes of the track member and the drive source with each other, an actuator having compact and slim structure can be obtained.

According to the invention of the eighth aspect, the sectional shape of the track member approaches a closed curved line, and in spite of the compact outer dimension, the second moment of area can be made large. For this reason, a motion guide apparatus having high rigidity such as flexure rigidity, torsional rigidity and the like can be obtained.

EXPLANATION OF REFERENCE NUMERAL

6—track rail, 7—movable block (movable member), 7a—a portion of movable block, 8—slit, 9—ball rolling groove (guide portion), 10—ball (rolling member), 11—extension, 13—loaded ball rolling groove, 17—screw shaft (driving mechanism), 18, 19—bracket (support column), 21—cover member, 31—electric motor (drive source), W1—slit width, W2—movable member width.

BEST MODE FOR EMBODYING THE INVENTION

Figure 1:
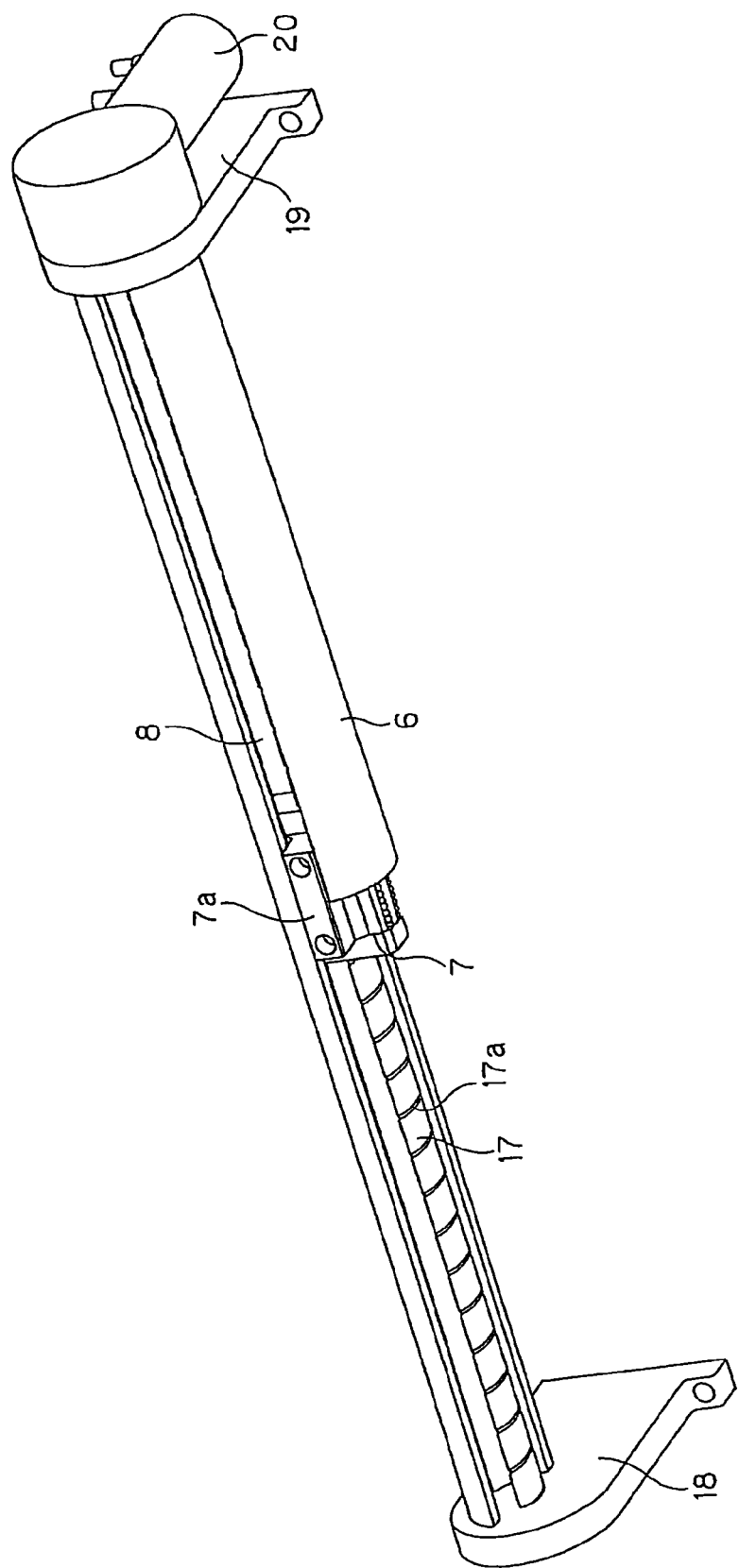
FIG. 1 is a perspective view of an actuator according to a first embodiment of the present invention.
Figure 2:
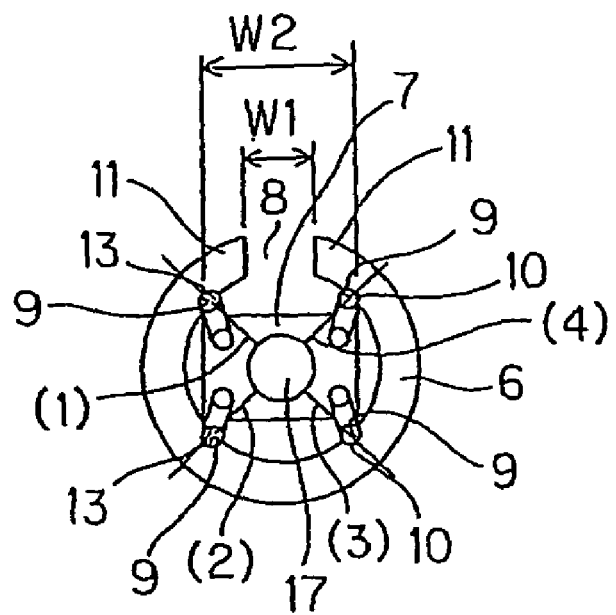
FIG. 2 is a sectional view of the actuator of FIG. 1.

FIGS. 1 and 2 represent an actuator according to the first embodiment of the present invention, in which FIG. 1 is a perspective view and FIG. 2 is a sectional view. In this actuator, a cylindrical track rail 6 is utilized as a hollow track member. Inside the track rail 6, a movable block 7 is disposed to be movable in the axial direction of the track rail 6. The track rail 6 is formed with a slit extending in the axial direction thereof. A portion of the movable block 7 projects from the slit 8, and a connection member, (detail of which is described hereinafter), connected to a movable object (object to be moved) is secured. The movable block 7 is slid in the axial direction of the track rail 6 by a ball screw mechanism as a drive mechanism.

The track rail 6 is supported, at its both ends, by brackets 18 and 19 as if it is floated. The slit 8 of the track rail 6 is, as shown in FIG. 2, formed only at one portion in the circumferential direction of the track rail 6 in a section perpendicular to the axial direction of the track rail 6. The sectional shape of the track rail 6 is not completely circular because of the formation of the slit, but it will be formed in a substantially circular-arc shape.

The track rail 6 has a guide portion for guiding the movement of the movable block 7. In this embodiment, the guide portion 9 is composed of a plurality of rows of ball rolling grooves 9 extending in the axial direction of the track rail. For example, the vertically two rows of ball rolling grooves 9 are formed on both the lateral sides, respectively, so as to oppose to the upper and lower portions of the lateral both side surfaces of the movable block 7. The ball rolling groove 9 is formed as a circular-arc groove having a single circular-arc having a sectional area which has a radius of curvature slightly larger than a radius of the ball. Further, in an arrangement in which the ball 10 is not disposed between the track rail 6 and the movable block 7, and the movable block 7 is slidably moved with respect to the track rail 6, a portion supporting the movable block 7 to be slidable is formed as a guide portion.

The guide portion 9 is provided with a pair of opposing extensions 11 so as to cover the movable block 7, and a slit 8 is formed between front ends of the opposing extensions 11. The location of such extensions 11 from the guide portion 9 makes the width W1 of the slit 8 narrower than the width W2 of the movable block 7. Accordingly, a tension (tensile) load to pull off the movable block 7 from the track rail 6 is applied to the movable block 7, and even if the ball is come off from the space between the track rail 6 and the movable block 7, the movable block 7 is never come off from the track rail 6.

Figure 3:
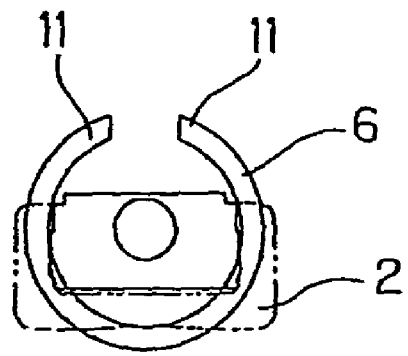
FIG. 3 is a sectional view in comparison of a track rail of the present invention with a conventional track rail having a U-shaped section.

FIG. 3 is an illustration showing a comparison between the tack rail 6 of the present embodiment and the conventional track rail 2 having U-shaped cross section. The track rail 6 of the present embodiment differs from the conventional track rail 2 in the point that the extensions 11 extend over the movable block 7. According to such arrangement, the sectional shape of the track rail 6 approaches a closed curved line, and hence, in spite of the compact outer dimension, there can be provided an actuator having high rigidity such as flexure rigidity, torsional rigidity and the like.

Figure 4:
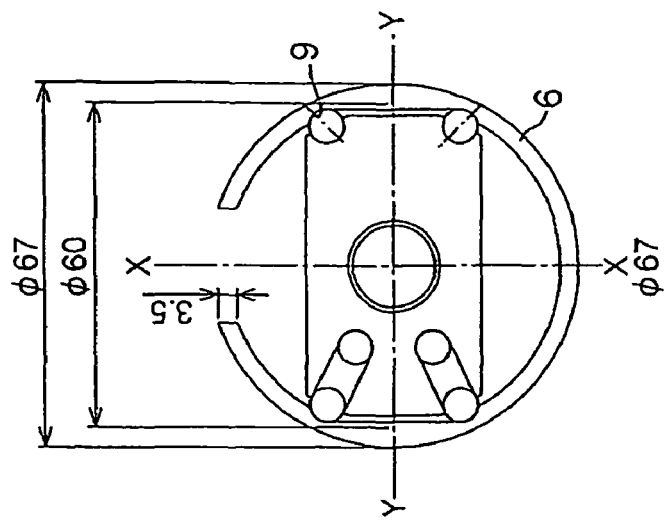
FIG. 4 is a sectional view in comparison in the second moment of area between the track rail of the present invention and a conventional U-shaped track rail.
Figure 4:
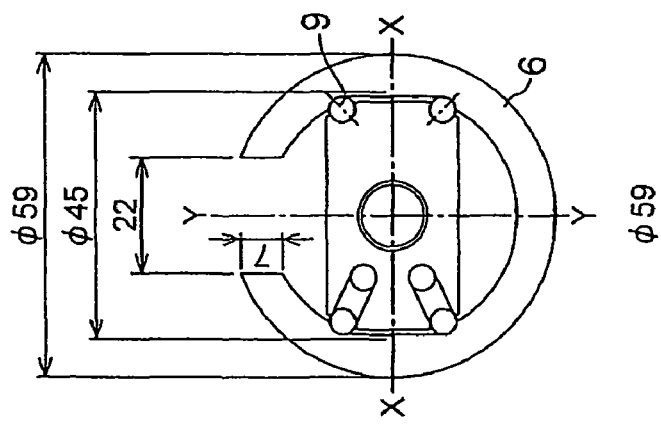
Figure 4:
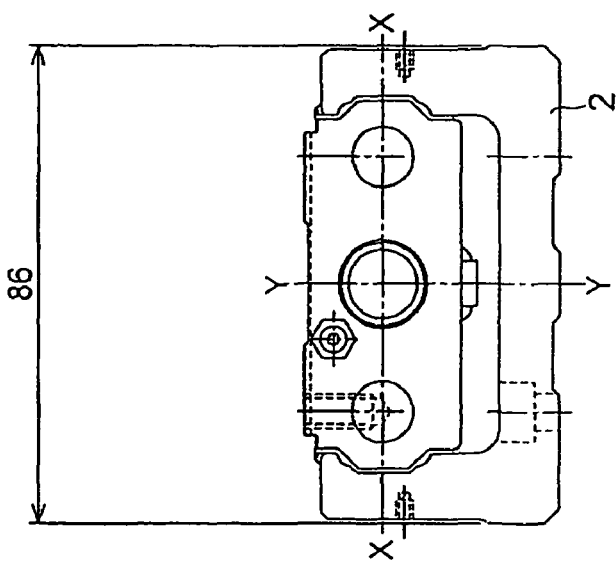

FIG. 4 shows comparison in shape of the track rail 6 of the present embodiment and the conventional track rail 2 having U-shaped cross section in a case that second moments of area IX-IX around the X-X axes are made substantially coincident with each other. In FIG. 4, a value of AREA represents areas of the track rails 2 and 6 which are proportional to weights of the track rails 2 and 6. From FIG. 4, it will be found that the value of the AREA can be reduced into ⅓ value, i.e. the weight thereof into ⅓ value, in an event when the track rail 6 having the circular-arc sectional shape obtains the same second moment of area around X-X axis as that of the track rail 2 having the U-shaped section. It is also found that a uniform flexure rigidity in every direction is obtainable because the second moment of area IX-IX around the X-X axes and the second moment of area IY-IY around the Y-Y axes are substantially equal to each other.

Further, although the outer periphery of the track rail 6 is formed so as to provide a circular-arc shape, strictly speaking, the inner periphery of the track rail 6 is not circular-arc shape because the ball rolling grooves 9 are formed to the inner periphery of the track rail 6 so as to accord with the outer shape of the movable block 7. The concept that the track rail 6 is formed substantially into circular-arc shape includes such a case.

As shown in FIG. 2, the movable block 7 is supported by the track rail 6 to be slidable through a number of balls 10. The movable block 7 has both side surfaces to each of which vertical two rows of loaded ball rolling grooves 13 are formed so as to extend linearly in a fashion opposing to the ball rolling grooves 9 formed to the track rail 6. Each of these loaded ball rolling grooves 13 is formed also as circular-arc groove having a radius of curvature slightly larger than a radius of the ball.

Figure 5:
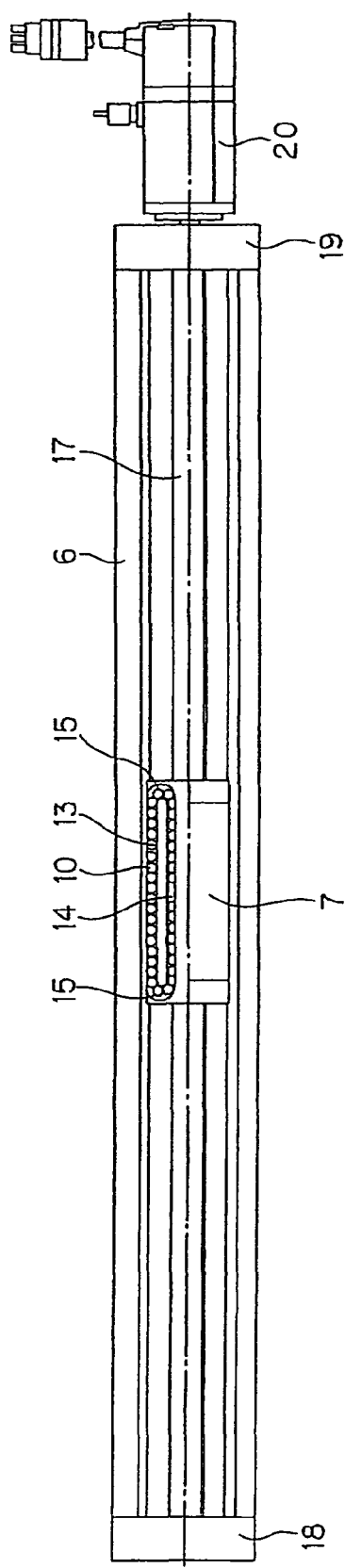
FIG. 5 is a sectional view of the actuator (in a plane parallel with the axis of the track rail).

With reference to FIG. 5, the movable block 7 is formed with a ball return passage 14 extending in parallel with the loaded ball rolling groove 13 and a pair of rolling direction changing passages 15 connecting, at both ends thereof, the ball return passage 14 and the loaded ball rolling groove 13. The direction changing passage 15 is formed so as to provide a circular-arc shape having substantially constant radius of curvature. However, the present invention is not limited to such structure, and the direction changing passage 15 may include a linear portion. These loaded ball rolling groove 13, the ball return passage 14 and the direction changing passages 15 constitute a ball circulation passage in form of circuit. When the movable block 7 is slid with respect to the track rail 6, the balls disposed between the movable block 7 and the track rail 6 roll and circulate along the ball circulation passage. According to such motion, the movable block 7 can be smoothly slid with respect to the track rail 6.

In the described embodiment, four rows (threads) of ball circulation passages are formed. Such four-row arrangement of the ball circulation passages will bear the load applied to the movable block 7 in every direction in the section shown in FIG. 2. The load bearing directions of the movable block 7 accord with the contact angle lines (1) to (4) in FIG. 2. Herein, the contact angle line means a line connecting a contact point between ball rolling groove 9 of the track rail 6 and the ball 10 and a contact point between the loaded ball rolling groove 13 of the movable block 7 and the ball 10. In the described embodiment, since the four rows of loaded ball rolling grooves 13 are formed, the four contact angle lines (1) to (4) exist, in which the upper two contact angle lines (1) and (4) incline, for example, by 45 degrees from a horizontal direction so as to direct obliquely upward in the outward direction from the center of the movable block 7, and on the other hand, the lower two contact angle lines (2) and (3) incline, for example, by 45 degrees from a horizontal direction so as to direct obliquely downward in the outward direction from the center of the movable block 7. According to such arrangement, there can be obtained an actuator which can bear the load in four directions of radial direction (downward direction), reverse radial direction (upward direction), and transverse direction (right and left directions). By forming the track rail 6 so as to provide a circular-arc sectional shape, the four contact angle lines (1) to (4) can be easily arranged in the radial direction.

Incidentally, in accordance with the load to be applied to the movable block 7, the number of rows of the loaded ball rolling grooves may be made two rows or so. In addition, in order to easily work the movable block, the movable block may be formed so as to provide a circular shape other than rectangular shape in section.

The screw structure of the movable block 7 will be described hereunder.

As shown in FIG. 1, the screw shaft 17 penetrates the central portion of the movable block 7. A ball rolling groove 17a for the spiral screw shaft is formed on the outer peripheral surface of the screw shaft 17. The ball rolling groove 17a of the screw shaft 17 has a sectional shape of, for example, gothic-arch having two circular-arc portions having a radius of curvature slightly larger than a radius of the ball. On the other hand, a loaded ball rolling groove for the screw shaft is formed to the through hole of the movable block so as to oppose to the ball rolling groove 17a of the screw shaft. The loaded ball rolling groove for the screw shaft has a circular shape in form of gothic-arch having a sectional shape also composed of two circular-arc portions having a radius of curvature slightly larger than the radius of the ball. Furthermore, the movable block 7 is provided with a return pipe for circulating the ball rolling between the ball roiling groove 17a of the screw shaft and the loaded ball rolling groove for the screw shaft.

The brackets 18 and 19 as columns for supporting both ends, in the axial direction, of the track rail are mounted to both the ends, in the longitudinal direction, of the track rail 6. These brackets 18 and 19 support the screw shaft to be rotatable. The brackets 18 and 19 and the track rail 6 are combined by fastening means such as bolts. A driving source 20 is mounted to the bracket 19, and an output of the driving source 20 is transmitted to the screw shaft 17. Only one of these brackets 18 and 19 may be used to cantilever the track rail 6 at the axial direction thereof and may be disposed on both axial sides of the track rail so as to support the same at both ends.

When the screw shaft 17 is rotated, the ball rolling in the circumferential direction on the ball rolling groove 17a of the screw shaft 17 while being loaded is scooped up by the return pipe. The scooped-up ball passes in the return pipe and is then returned on the ball rolling groove 17a of the screw shaft at a portion apart by several pitches.

Figure 6:
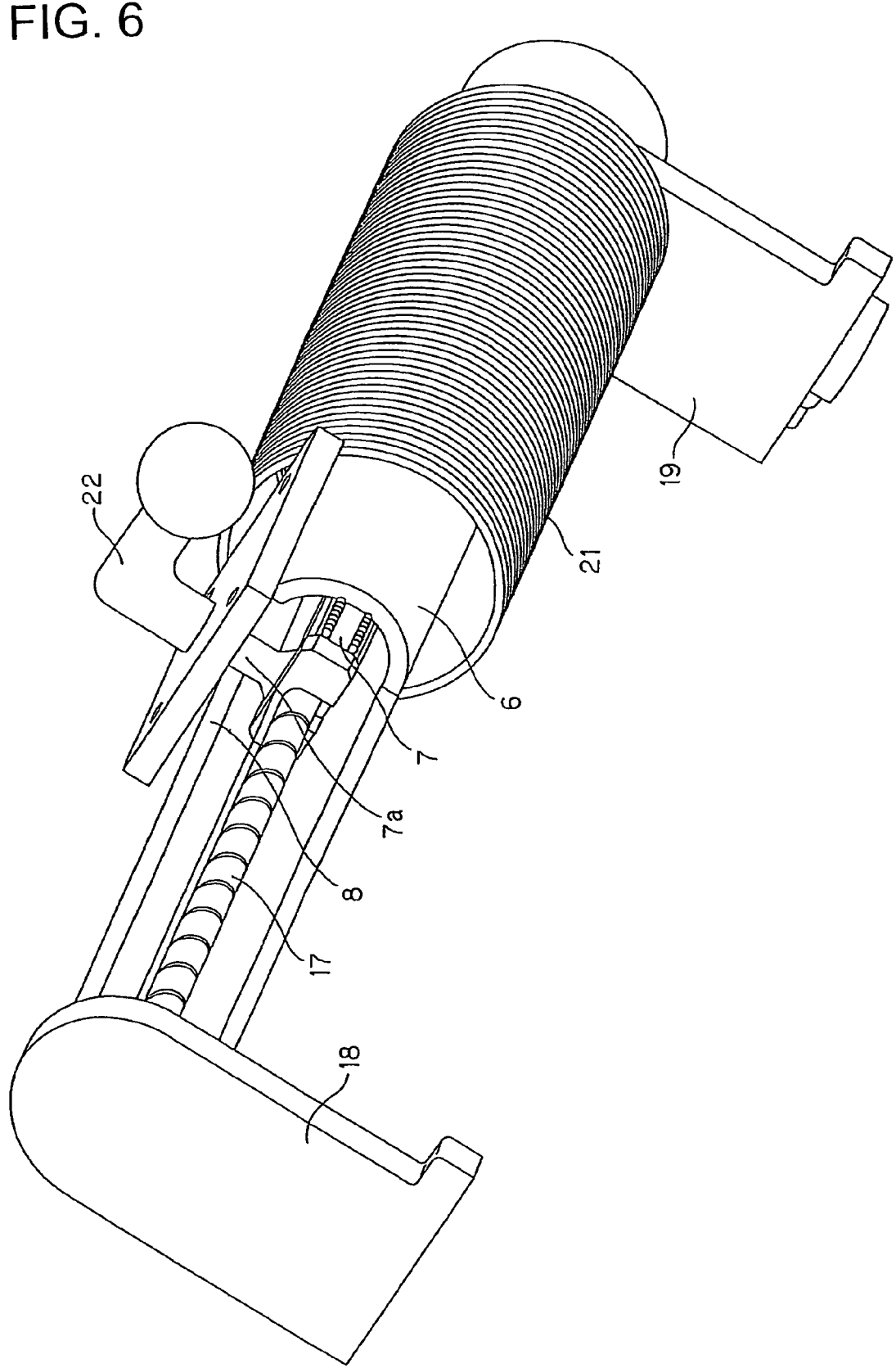
FIG. 6 is a perspective view of the actuator with a cover being removed.

FIG. 6 shows the actuator of the structure mentioned above to which a connection member and a cover member are mounted. The track rail is covered by a cover member 21 in shape of bellows. The cover member 21 has both ends which are mounted to the brackets 18 and 19, respectively. A portion 7a of the movable block 7 (this portion 7a of the movable block 7 may be integrally formed with the movable block or fastened thereto by means of bolt) projects through the slit 8 of the track rail 6. In this embodiment, the portion 7a is formed as a separate member of the movable block 7 and fastened thereto by means of bolt. Further, the connection member 22 constituting a portion of the movable block 7 has a bent rod shape. The connection member 22 has a spherical front portion which is fitted to a movable object. The connection member 22 penetrates the cover member 21 and the penetrating portion thereof is sealed by bonding means or band. The cover member 21 in form of bellows is formed from rubber, cloth, aluminium fiber or so. The cover member 21 may be formed from one block or two blocks to be assembled.

The inside of the actuator can be sealed by covering the track rail 6 by the cover member 21 in the floated state with the function of the actuator being maintained. Further, the entire inner volume of the cover member 21 does not change even if the movable block is slid and the cover member be expanded or contracted (though the volume of the wall section of the cover member 21 may be changed by the expansion or contraction thereof). Because of this reason, even if the movable block 7 is slid, the cover member 21 is not expanded or contracted.

Figure 7:
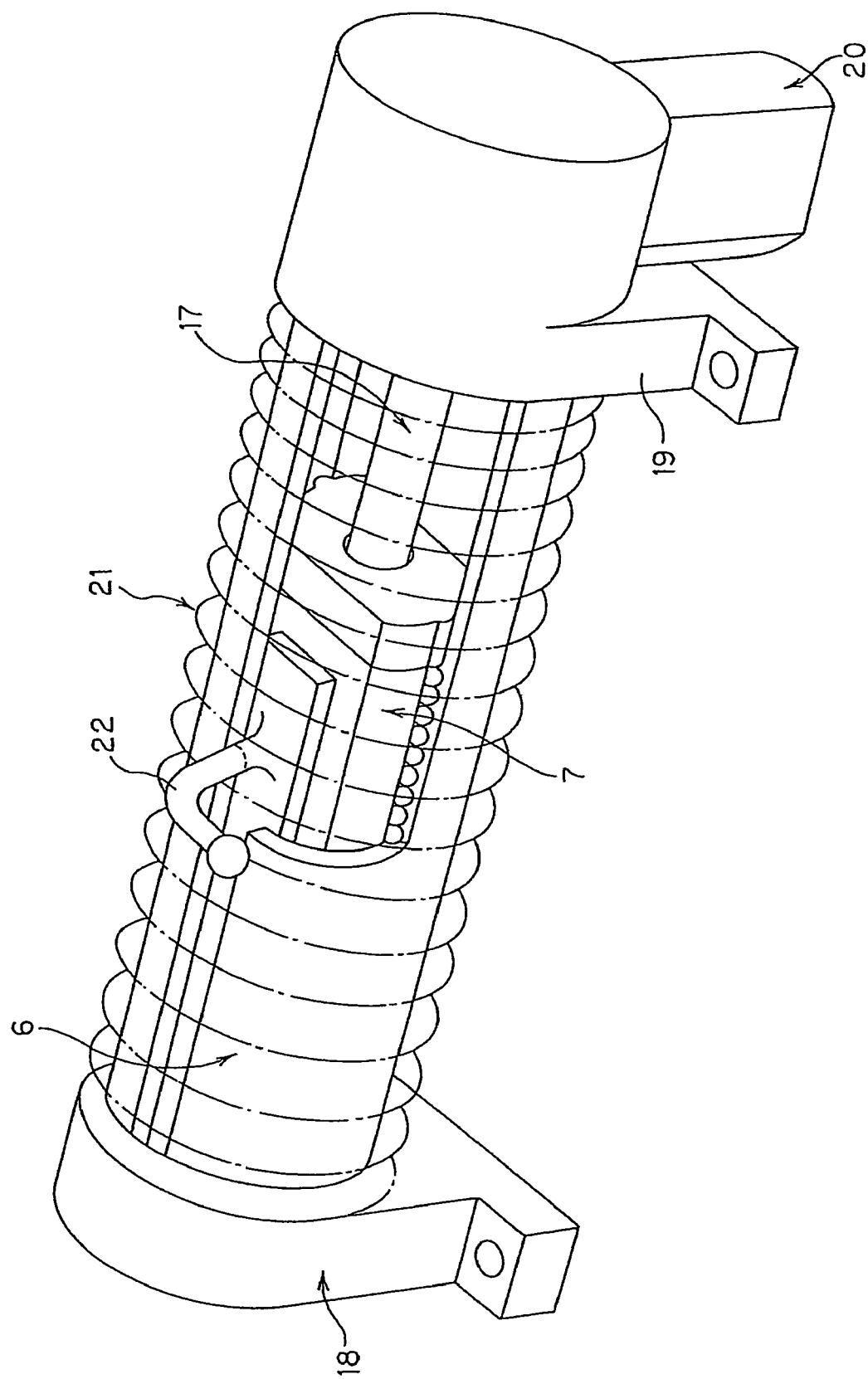
FIG. 7 is a perspective view of an actuator according to a second embodiment of the present invention.

FIG. 7 shows an actuator according to the second embodiment of the present invention. The actuator of this embodiment has substantially the same structure as that of the first embodiment, but differs from the first embodiment in the shape of the connection member 22 constituting a portion of the movable block 7. The shape of the connection member 22 will be determined in accordance with the use of the actuator, the condition connected with the movable object, or the like. Of course, it is not necessary to form the connection member 22 in form of rod as in the first and second embodiments.

Figure 8:
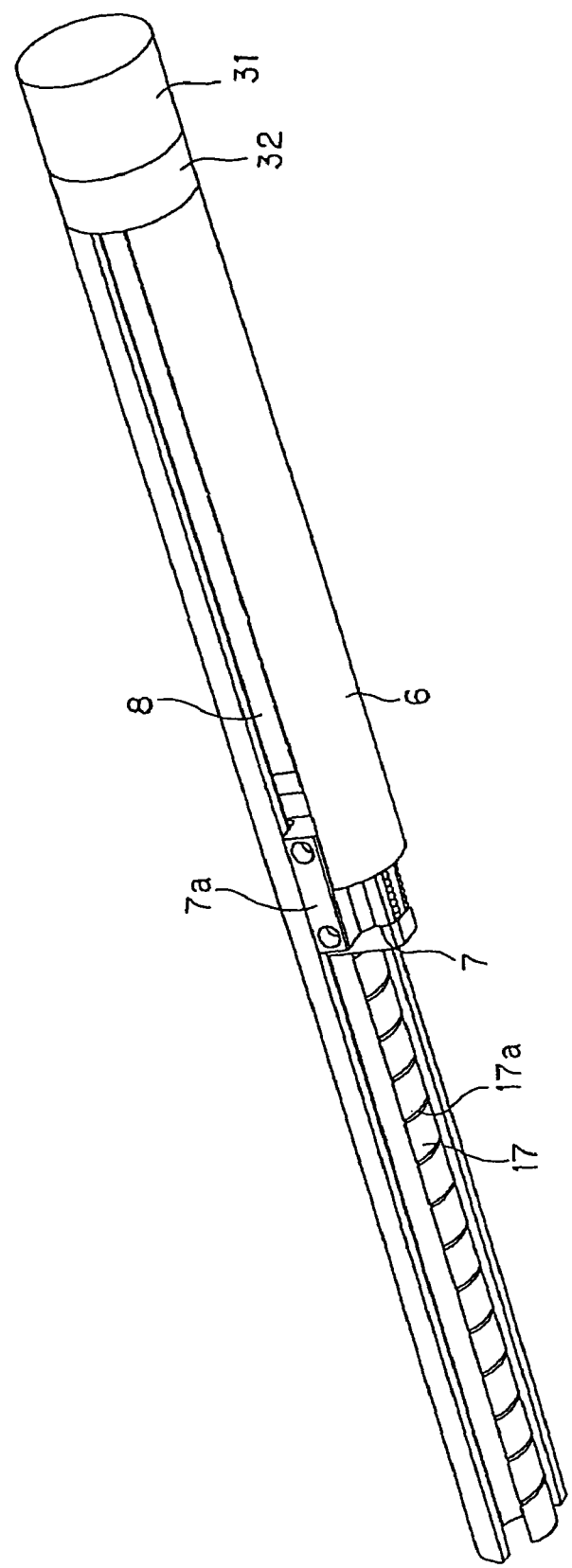
FIG. 8 is a perspective view of an actuator according to a third embodiment of the present invention.
Figure 9:
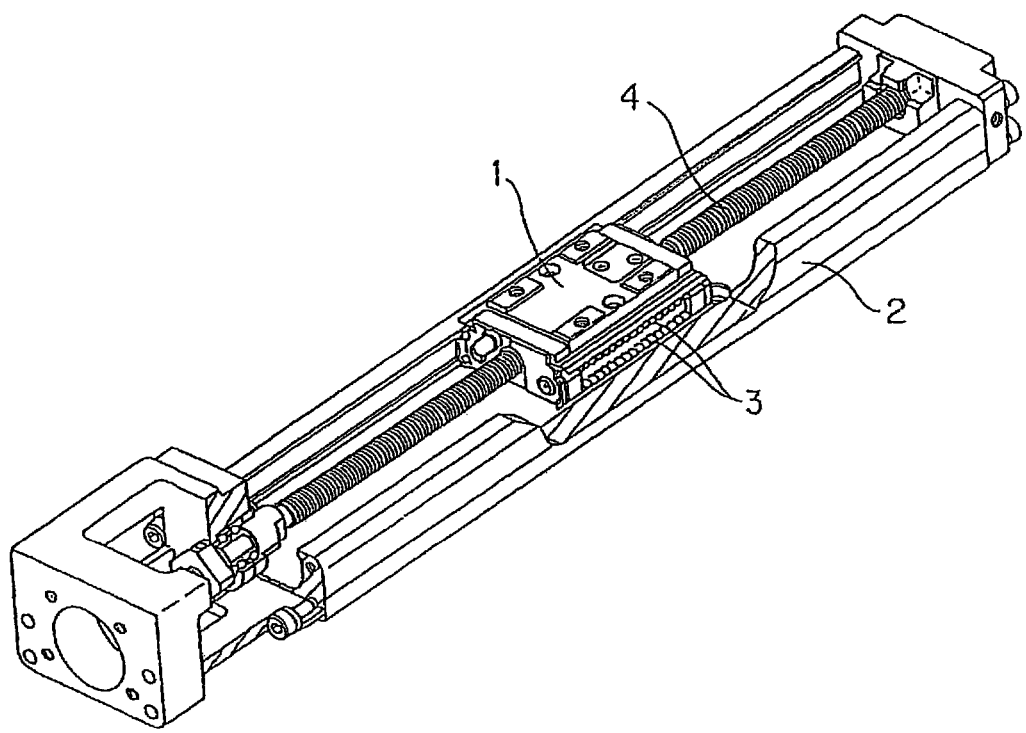
FIG. 9 is a perspective view of a conventional actuator.

FIG. 8 shows an actuator according to the third embodiment. The actuator of this third embodiment has a structure such that the center line of the screw shaft 17 accords with the center line of the output shaft of the electric motor 31 as a drive source for rotating the screw shaft, and that in a sectional surface perpendicular to the axial direction of the track rail 6, the outer shape of the electric motor 31 is formed into a circular shape so as to accord with the shape of the track rail 6. a reduction mechanism 32 such as circular harmonic drive, planetary gear or the like is interposed between the output shaft of the electric motor 31 and the screw shaft 17. The track rail 6, the movable block 7, screw shaft 17 and the like have the structures substantially the same as those of the actuator of the first embodiment, so that the same reference numerals are added and their explanations are omitted herein.

According to the actuator of this embodiment, the outer shapes of the track rail 6 and the electric motor 31 can be coincident with each other, thus providing compact and slim actuator. In addition, by using the direct drive motor as the electric motor 31 and directly connecting the rotor to the screw shaft 17, the axial length of the actuator can be made short without interposing the reduction mechanism. Moreover, an electrically driven cylinder may be utilized in place of the electric motor 31.

Further, it is to be noted that the present invention is not limited to the described embodiments and many other changes and modification may be made without departing from the subject feature of the present invention. For example, a track rail having, in section, an elliptical shape, an elongated circular shape (having central rectangular shape and circular end shape) and the like shape may be adopted in place of the circular-arc shape. A column may be disposed only at one end side of the track rail. Further, rollers may be utilized in place of balls. A spacer may be interposed between the adjacent balls to prevent the balls from contacting to each other.

The invention claimed is:

1. An actuator comprising:
   a hollow track member having a slit extending in an axial direction thereof and having a first length extending in the axial direction;
   a movable member disposed inside the track member to be movable along the track member and having a second length extending in the axial direction, wherein the second length is shorter than the first length; and
   a drive mechanism for moving the movable member along the axial direction of the track member,
   wherein an entire exposed outer periphery of the track member has a substantially circular-arc shape in a section perpendicular to the axial direction of the track member,
   wherein an inner periphery of the track member has a substantially circular-arc shape,
   wherein an outer periphery of the movable member has a substantially polygon shape in the section,
   wherein the track member is formed with a plurality of rolling member rolling grooves extending in the axial direction thereof as the guide portion, the movable member is formed with a plurality of loaded rolling member rolling grooves opposing to the rolling member rolling grooves, respectively, and the movable member has two side surfaces to each of which two rows of the loaded rolling member rolling grooves are formed, and a number of rolling members are interposed between the rolling member rolling grooves of the track member and the opposing loaded rolling member rolling grooves of the movable member, respectively, to be rollable therebetween,
   wherein the two rows of the loaded rolling member rolling grooves extend in the axial direction of the track member, and
   wherein a first row of the two rows of the loaded rolling member rolling grooves is positioned in vertical direction with respect to a second row of the two rows of the loaded rolling member rolling grooves.

2. The actuator according to claim 1, wherein the drive mechanism is provided with a screw portion formed to the movable member and a screw shaft to be screw engaged with the screw portion, the screw shaft penetrating the movable member, the screw shaft has a center line coincident with a center line of an output shaft of a drive source rotating the screw shaft, and the drive source has an outer substantially circular shape in a section perpendicular to the axial direction of the track member.

3. A motion guide apparatus comprising:
   a hollow track member having a slit extending in an axial direction thereof and having a first length extending in the axial direction; and
   a movable member disposed inside the track member to be movable along the track member and having a second length extending in the axial direction, wherein the second length is shorter than the first length,
   wherein the track member has, in a section perpendicular to the axial direction of the track member, a guide portion for guiding movement of the movable member and an extension extending from the guide portion so as to cover the movable member, and a width of the slit of the track member formed between the opposed extensions is narrower than a width of the movable member,
   wherein an entire exposed outer periphery of the track member has a substantially circular-arc shape in the section,
   wherein an inner periphery of the track member has a substantially circular-arc shape,
   wherein an outer periphery of the movable member has a substantially polygon shape in the section,
   wherein the track member is formed with a plurality of rolling member rolling grooves extending in the axial direction thereof as the guide portion, the movable member is formed with a plurality of loaded rolling member rolling grooves opposing to the rolling member rolling grooves, respectively, and the movable member has two side surfaces to each of which two rows of the loaded rolling member rolling grooves are formed, and a number of rolling members are interposed between the rolling member rolling grooves of the track member and the opposing loaded rolling member rolling grooves of the movable member, respectively, to be rollable therebetween, wherein the two rows of the loaded rolling member rolling grooves extend in the axial direction of the track member, and wherein a first row of the two rows of the loaded rolling member rolling grooves is positioned in vertical direction with respect to a second row of the two rows of the loaded rolling member rolling grooves.

4. An actuator comprising:

a hollow track member having a slit extending in an axial direction thereof and having a first length extending in the axial direction;

a movable member disposed inside the track member to be movable along the track member and having a second length extending in the axial direction, wherein the second length is shorter than the first length; and a drive mechanism for moving the movable member along the axial direction of the track member, wherein the track member has, in a section perpendicular to the axial direction of the track member, a guide portion for guiding movement of the movable member and at least two extensions opposing to each other, each of the extensions extending from the guide portion so as to cover the movable member, wherein the slit is formed between the opposing extensions, a width of the slit of the track member is narrower than a width of the movable member, wherein an entire exposed outer periphery of the track member has a substantially circular-arc shape in the section, wherein an inner periphery of the track member has a substantially circular-arc shape, wherein an outer periphery of the movable member has a substantially polygon shape in the section, wherein the track member is formed with a plurality of rolling member rolling grooves extending in the axial direction thereof as the guide portion, the movable member is formed with a plurality of loaded rolling member rolling grooves opposing to the rolling member rolling grooves, respectively, and the movable member has two side surfaces to each of which two rows of the loaded rolling member rolling grooves are formed, and a number of rolling members are interposed between the rolling member rolling grooves of the track member and the opposing loaded rolling member rolling grooves of the movable member, respectively, to be rollable therebetween, wherein the two rows of the loaded rolling member rolling grooves extend in the axial direction of the track member, and wherein a first row of the two rows of the loaded rolling member rolling grooves is positioned in vertical direction with respect to a second row of the two rows of the loaded rolling member rolling grooves.

5. The actuator according to claim 4, wherein the slit is formed at only one portion in a circumferential direction of the track member in a section perpendicular to the axial direction of the track member.

6. The actuator according to claim 4 or 5, wherein the track member is provided with a cover member expandable and contractable in the axial direction of the track member so as to entirely cover the track member in the section perpendicular to the axial direction of the track member, and a portion of the movable member projecting over the slit of the track member penetrates the cover member.

* * * * *